April 21, 1931.  H. H. CANNON  1,801,539
METHOD OF CLEANING FILTER TUBES
Filed Oct. 2, 1929
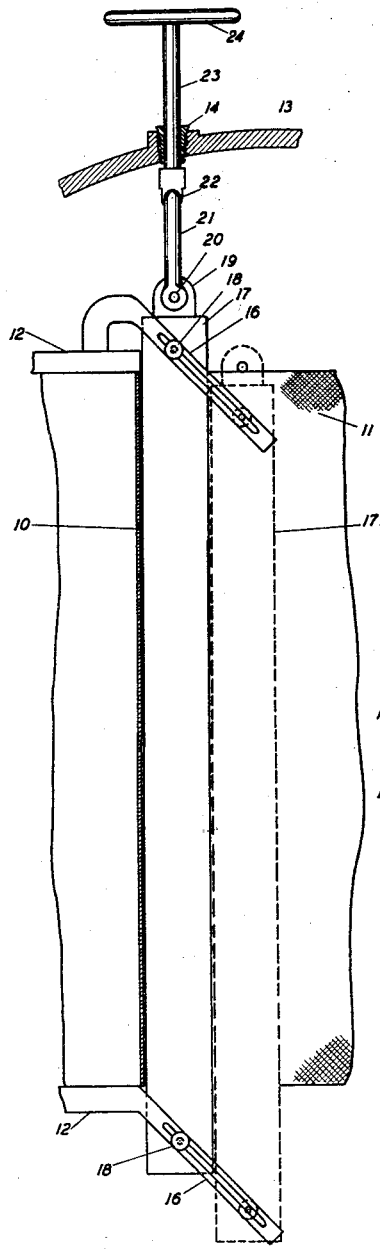
FIG.1
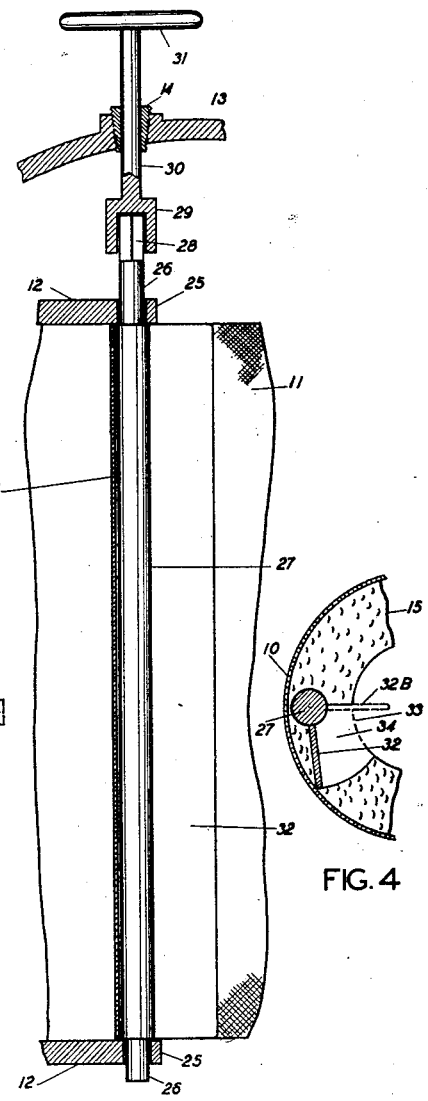
FIG. 2
FIG. 3
FIG. 4
HUGH HARLEY CANNON
INVENTOR
ATTORNEY Patented Apr. 21, 1931

1,801,539

UNITED STATES PATENT OFFICE

HUGH HARLEY CANNON, OF LOS ANGELES, CALIFORNIA, ASSIGNOR TO CANNON-PRUTZMAN TREATING PROCESSES, LTD., OF LOS ANGELES, CALIFORNIA, A CORPORATION OF CALIFORNIA

METHOD OF CLEANING FILTER TUBES

Application filed October 2, 1929. Serial No. 396,897.

My invention relates to the art of filtering comminuted solids from liquids, and to that branch of the art which relates to the use of tubular filtering elements fed from the inside.

My invention relates specifically to a manner and a variety of means for so releasing from the cloth the tubular cake of solids which forms within such tubular filtering elements as to enable it to be readily discharged from the tube.

When tubular filtering elements are fed inside with a mixture of liquid and comminuted solid, the liquid portion of the suspension passes through the wall of the element and the solid is deposited on the inside in a layer which gradually increases in thickness. If filtration be long enough continued this cake will grow toward the center until it fills the tube, but to enable the cake to be removed it is customary to terminate the filtering stage of the operation some time before this complete closure is reached, for instance, at a point where the thickness of the cake is equal to about half the radius of the tube.

When the filtration is finished, that is, when the cake has attained the desired thickness, it is customary to withdraw the supply of suspension from the inside of the tube and to blow steam, air or other gas through the cake until it is dried out so far as is possible. A washing operation may be interposed between filtration and drying out if the liquid entrained in the cake is either valuable or viscous.

After drying out the cake it is customary to expose an end of the tube by any suitable means and to apply air under pressure to the outside of the tube, by which pressure, if the tube is of cloth or other flexible material, if the tubular cake within is theoretically compressed to that slightly smaller diameter which will enable it to be readily discharged from the tube, by gravity if the tube be vertically set or by extrusion means if the tube be in a horizontal position.

The fallacy in this theory is that the tubular cake is built up under such conditions as to give it the greatest density consistent with the nature of its component material, the cake forming by gradual accretion of suspended particles which, by the flow of liquid from the inside to the outside of the cake, are wedged into every available crevice and compacted to the last degree. Further, the tubular cake forms a perfect arch in each direction so that its distortion by outside pressure can follow only from crushing and never from bending.

It follows that unless the cake is very thoroughly dried out and unless it is composed of rounded grains so as to form a friable mass, the compressive effect of such outside pressures as can be tolerated in a press of feasible strength will produce an insignificant if any change in diameter, and discharge in this manner is effective only under the most favorable conditions.

I have discovered that if a longitudinal section be removed from such a tubular cake, so that the arch is, as it were, unkeyed, a bending effect is brought into play by which, at much reduced pressures, the cake may be thoroughly broken down and made amenable to ready discharge by means of gravity or an air blast directed longitudinally through the tube. The narrow strip of cloth exposed by the removal of the longitudinal section of the cake is forced into the slot thus formed, crumbling its edges, and this failure is rapidly transmitted around the entire arch with the result that the cake is thoroughly disintegrated.

Obviously such a slot may be formed through the length of the cake, after exposing an end of the tube, by means of a simple grooving tool forced or drawn through the length of the tube. This operation is entirely consistent with the spirit of my invention, but as it would be tedious and would damage the cloths if persisted in, I prefer to use one or the other of the devices illustrated in the attached drawings, in which Figure 1 illustrates in vertical elevation a device for forming and relieving a longitudinal slot in a tubular filter cake, the relieving movement being effected by a longitudinal movement of a handle situated outside the press;

Figure 2 illustrates in cross section a portion of the cake and the bar which forms the slot in Fig. 1.

Figure 3 illustrates in vertical section a device for relieving a longitudinal slot in which the relieving movement is effected by a rotating movement of a projecting handle, and Figure 4 illustrates in cross section a portion of the cake and of the vane which forms the slot in Fig. 3.

Referring to all four figures, 10 is a portion of the tubular filtering element appearing in section and 11 a portion appearing in elevation, the opposite side of each tube being broken away. 12—12 are the tube sheets in which the ends of the tubes are fixed. 13 is a broken portion of the upper head or cap comprising part of the shell surrounding the filtering elements and enclosing the tube ends, the corresponding lower portion of the shell not being shown. 14 is a stuffing box fixed in the head and through which the actuating rod passes. 15—15 are broken portions of the tubular cakes formed within the filter tubes.

Referring now to Figs. 1 and 2 only, 16—16 are slotted flat bars projecting from and attached to the tube sheets at an angle of perhaps 45°. The upper of these bars curves over the upper edge of the tube and projects downwardly into it, the lower projects downwardly below the lower end.

The substantially flat or slightly tapered bar 17 extends both above and below the opposite ends of the tube and is supported from the slotted bars by the flat headed studs 18, the shanks of which slide freely in the slots. A projection 19 at the upper end of the bar carries a pin 20 on which the link 21 is swivelled, the upper end of this link being correspondingly swivelled at the lower end 22 of the actuating rod 23, which passes through stuffing box 14 and terminates in a T handle 24.

On raising this handle to its upper limit the pins 18 slide upward until the bar 17 is brought into contact with the cloth which forms the inner layer of the filtering element 10. The press being operated with the bar in this position, as indicated at 17, cake forms around the inside of the tube except for the space occupied by the bar. Filtering, washing and drying being completed, the lower end of the tube is exposed in any suitable manner and the handle 24 forced down, thus moving the longitudinal bar to the position shown at 17B. This movement opens a slot of a width equal to that of the bar, by means of which slot the crushing of the cake may be accomplished by outside pressure as aforesaid.

Referring now to Figs. 3 and 4, 25—25 are lugs extending from the tube sheets over the ends of the tube at one side, these lugs being preferably removably attached. In these lugs are pivoted the reduced ends 26 of a round bar 27 which is so placed as to closely approach the inner layer of the filtering element. The upper end of this bar is squared as at 28, this square fitting a corresponding socket 29 formed on the lower end of the actuating rod 30 which passes through the stuffing box 14 and terminates in a T-handle 31. The round bar 27 is equipped with a longitudinal vane 32 which, by turning the handle 31, may be revolved to the position 32B. The purpose of the square end and socket 28—29 is to enable a swinging press head (13) to be swung upward without effecting the position of the bar assembly.

During the filtering operation the vane is turned down against the cloth and cake will build up over it to more or less the position indicated at 33. The filtration, washing and drying being completed and the tube end exposed, a quarter turn of handle 31 will bring the vane to the position 32B and in doing so will break out the portion of the cake indicated at 34. On then applying outside pressure to the cake it will crumble from the side opposite the position of the vane, if not from both edges, and its destruction will rapidly and completely follow.

I prefer the form of apparatus shown in Figs. 3 and 4 as being cheaper, requiring less effort and as opening a wider slot or hiatus in the cake. It will be evident, however, that numerous mechanical movements might be adapted to produce the same result, and I therefore claim, not merely the preferred device, but also the method or manner of breaking down tubular filter cakes described and limited in the appended claims.

My method will be found very useful in handling aqueous cakes of a tough or sticky nature, which cannot be made to flow and which are not readily subject to compression and particularly to the cakes resulting from the filtration from various kinds of oil of such bodies as diatomaceous earth, decolorizing clays and dry treating chemicals.

I claim is my invention:

1. A method of assisting the removal of tubular filter cakes from tubular filtering elements including the formation of a longitudinal opening through said cake, said opening being of substantially the length and the depth of said cake.

2. A method of removing tubular filter cakes from tubular filter elements, comprising: forming a longitudinal opening through said cake and thereafter applying outside pressure to said cake.

3. A method of removing tubular filter cakes from tubular filter elements, comprising: forming a groove through the thickness of said cake and for substantially its length and thereafter applying outside pressure to said cake.

4. A method of removing tubular filter cakes from tubular filter elements, comprising: forming an unsupported longitudinal edge substantially the length of said cake and exposing said edge to external pressure.

In witness that I claim the foregoing I have hereunto subscribed my name this 25th day of September, 1929.

HUGH HARLEY CANNON.